US007143164B2

(12) United States Patent
Antonov et al.

(10) Patent No.: US 7,143,164 B2
(45) Date of Patent: *Nov. 28, 2006

(54) DYNAMIC OBJECT LIBRARY SOFTWARE ARCHITECTURE

(75) Inventors: Vadim Antonov, Belmont, CA (US); Mikhail Kourjanski, Albany, CA (US)

(73) Assignee: Exigen Group, San Francisco, CA (US)

( * ) Notice: Subject to any disclaimer, the term of this patent is extended or adjusted under 35 U.S.C. 154(b) by 475 days.

This patent is subject to a terminal disclaimer.

(21) Appl. No.: 09/905,630

(22) Filed: Jul. 13, 2001

(65) Prior Publication Data

US 2004/0015926 A1    Jan. 22, 2004

Related U.S. Application Data

(60) Provisional application No. 60/292,834, filed on May 21, 2001.

(51) Int. Cl.
 *G06F 15/173* (2006.01)
 *G06F 15/16* (2006.01)
 *G06F 9/44* (2006.01)

(52) U.S. Cl. .......................... 709/225; 709/232; 726/3; 717/164

(58) Field of Classification Search .............. 717/103, 717/111, 163, 165, 171, 172, 173, 177, 162, 717/108, 216, 153, 164; 709/201–203, 229, 709/234, 224, 225, 232; 715/773, 734; 707/203, 707/1, 8; 718/107; 713/200; 719/315; 726/3
See application file for complete search history.

(56) References Cited

U.S. PATENT DOCUMENTS

| 4,156,798 | A | * | 5/1979 | Doelz ............................ 700/4 |
| 5,295,188 | A | | 3/1994 | Wilson et al. |
| 5,351,293 | A | | 9/1994 | Michener et al. |
| 5,421,012 | A | * | 5/1995 | Khoyi et al. ................. 718/107 |
| 5,826,265 | A | * | 10/1998 | Van Huben et al. ............ 707/8 |
| 5,828,840 | A | | 10/1998 | Cowan et al. |
| 5,848,354 | A | * | 12/1998 | Kamalski .................... 340/7.43 |
| 5,878,408 | A | * | 3/1999 | Van Huben et al. ............ 707/1 |
| 5,933,599 | A | * | 8/1999 | Nolan ......................... 715/734 |
| 6,016,393 | A | * | 1/2000 | White et al. ................. 719/315 |
| 6,058,393 | A | | 5/2000 | Meier et al. |
| 6,105,063 | A | * | 8/2000 | Hayes, Jr. .................... 709/223 |

(Continued)

OTHER PUBLICATIONS

Title: Extracting Library-Based Object-Oriented Applications, author: Sweeney et al, ACM, 2000.*

(Continued)

*Primary Examiner*—Antony Nguyen-Ba
(74) *Attorney, Agent, or Firm*—Greenberg Traurig LLP; John P. Ward

(57) ABSTRACT

A system for utilizing an object library to dynamically match the type structures of a client and a server to determine compatibility. Once compatibility has been established, the client and server can communicate through a secure connection. Information can be sent asynchronously between the client and the server, and a flow control provides a buffer at the flow origin to ensure that there is no overflow of information to the recipient of the flow.

3 Claims, 5 Drawing Sheets

U.S. PATENT DOCUMENTS

| | | | |
|---|---|---|---|
| 6,119,130 A * | 9/2000 | Nguyen et al. | 707/203 |
| 6,119,157 A * | 9/2000 | Traversat et al. | 709/220 |
| 6,131,121 A | 10/2000 | Mattaway et al. | |
| 6,141,759 A | 10/2000 | Braddy | |
| 6,185,184 B1 | 2/2001 | Mattaway et al. | |
| 6,185,680 B1 | 2/2001 | Shimbo et al. | |
| 6,189,101 B1 | 2/2001 | Dusenbury, Jr. | |
| 6,195,680 B1 | 2/2001 | Goldszmidt et al. | |
| 6,212,633 B1 | 4/2001 | Levy et al. | |
| 6,226,678 B1 | 5/2001 | Mattaway et al. | |
| 6,360,266 B1 * | 3/2002 | Pettus | 709/227 |
| 6,374,308 B1 * | 4/2002 | Kempf et al. | 719/316 |
| 6,381,742 B1 * | 4/2002 | Forbes et al. | 717/176 |
| 6,405,317 B1 * | 6/2002 | Flenley et al. | 713/200 |
| 6,499,137 B1 * | 12/2002 | Hunt | 717/164 |
| 6,532,591 B1 * | 3/2003 | Arai et al. | 725/132 |
| 6,654,805 B1 * | 11/2003 | Aldred et al. | 709/224 |
| 6,664,982 B1 * | 12/2003 | Bi | 715/773 |
| 6,697,340 B1 * | 2/2004 | Christie et al. | 370/259 |

OTHER PUBLICATIONS

Microsoft Computer Dictionary, Fifth Edition, published on 2000.*
Dietel-Lunia-Rowlance, Asynchronous Software Communication Using Response Objects, IBM TDB, TDB v37 n2A Feb. 1994 p. 617-618.*
Chatterjee et al., "Adaptive QoS Support For Distributed, Java-Based Applications", ACM, 1999.
Johnson et al., "A Secure Distributed Capability Based System", pp. 392-402, ACM, 1985.
Ramaswamy, "Application of a Key Generation and Distribution Algorithm For Secure Communication In Open Systems Interconnection Architecture", pp. 175-180, IEEE, 1989.

* cited by examiner

DYNAMIC OBJECT LIBRARY SOFTWARE ARCHITECTURE

The present application claims priority to the provisional filed application entitled Novel Dynamic Object Library Software Architecture, filed on May 21, 2001, Ser. No. 60/292,834, which is also incorporated herein by reference.

FIELD OF THE INVENTION

The present invention relates to the field of software architecture. In particular, the present invention discloses a method for dynamically matching a server and a client over a secure connection and providing information asynchronously between the client and the server, while utilizing a flow control of the information.

BACKGROUND

Large data centers that are used to transmit customer information, credit card information or the like inherently have many problems. For most of the data centers, the biggest issues are lack of security, decreased quality of performance, scalability issues, and version flexibility to support application sharing among customers (multi-tenancy).

As the number of customers of a data center increases or if a data center has multiple locations serving multiple customers, security may decrease. Security issues are of great importance for these data centers that serve multiple clients (i.e., banking and financial institutions), as they may have competitors who are generally "hostile" toward one another. It is therefore necessary to provide a secure connection that allows client information to be sent through these data centers without compromising the security of the information.

With data centers being spread over multiple locations, dramatic decreases in guaranteed performance may also occur. It is necessary for a system in which shared use of a data center in multiple locations does not diminish performance.

A further issue with respect to the larger data centers is the problem of adaptability. In an application-sharing model, small customers share the same application. As customer use grows, the data centers must then be able to adapt to this increased growth. Unless adaptation can take place, the economies of scale will not allow for decreased costs. However, if the data centers are able to expand easily, the sharing of the applications becomes much more cost effective.

Version flexibility may also become a large problem because various customers may have different software version requirements, thus requiring multiple versions to be in use simultaneously. The architecture must be able to adapt to a variety of customer versions or the sharing of applications cannot work well. Additionally, the upgrade policy within the data centers must be flexible enough to allow client software to remain intact while server software is upgraded because it is unreasonable to demand a synchronous upgrade of all client software in the ASP setting.

Various software applications, including CORBA® (a registered trademark of Object Management Group, Inc), Microsoft COM/DCOM, ENTERPRISE JAVABEANS® (a registered trademark of Sun Microsystems, Inc), and others, have attempted to address these problems. But none of these applications have been able to satisfactorily address all problems.

Thus a need exists for a new software architecture that avoids those shortcomings, and allows information to be transmitted securely between a client and a server.

SUMMARY OF THE INVENTION

In accordance with the teachings of the present invention, a method for dynamically matching a first and a second process, the first and second processes being matched using a library, the first and second processes utilizing a secure flow control of information and being connected asynchronously, is disclosed.

Other objects, features, and advantages of the present invention will be apparent from the accompanying drawings and from the detailed description that follows below.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific configurations are set forth in order to provide a thorough understanding of the present invention. However, it will also be apparent to one skilled in the art that the present invention may be practiced without the specific details. In other instances, well-known features are omitted or simplified in order not to obscure the present invention.

Figure 1:
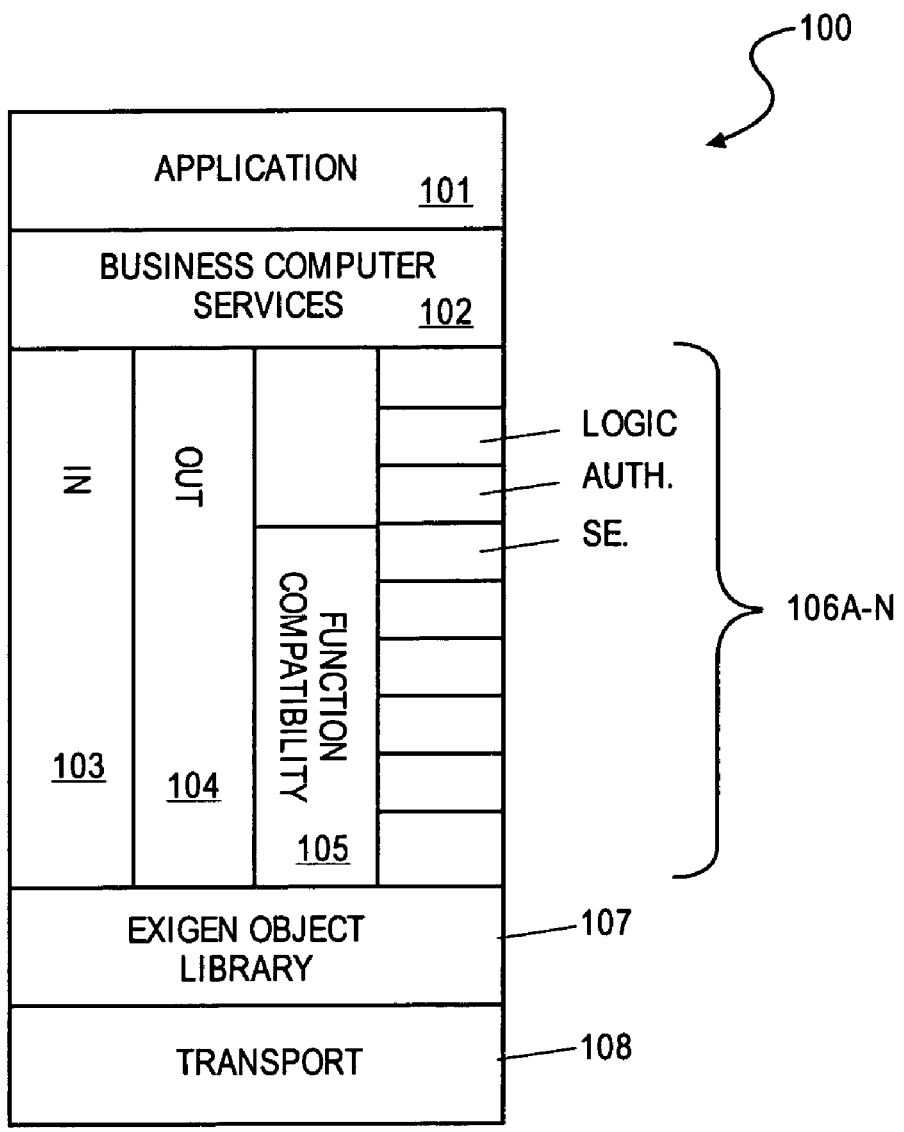
FIG. 1 is an overview illustration of a structure in which the Exigen Object Library (EOL) would function between a transport layer and an application, according to one embodiment.

Referring now to FIG. 1, wherein an overview illustration of a structure in which the Exigen Object Library (EOL) would function between a transport layer and an application in accordance with one embodiment is shown. As illustrated, the structure 100 contains a running application 101, which uses an EOL application program interface (API), defined in detail in Appendix E. Beneath the running application is business computing services management 102. Below the business computing services management 102 are input channel 103 and output channel 104, functional compatibility modules (objects) 105 and services such as logic, authentication, security issues, etc. 106*a–n*. Beneath the input and output channels 103 and 104, the functional compatibility modules 105 and the services 106*a–n* is the Exigen Object Library (EOL) 107 that stores information for creating objects. The application program 101 uses the EOL 107 to access services 106a–n such as server computer authentication and the like. The EOL 107 is immediately above a transport layer 108 that is the bottom of the structure 100. The topology of the transport layer 108 may depend on the actual network, but in most cases it would typically be an IP network-type topology. Thus layers 107 and 106a–n provide an underlying foundation for the computing services 102 and applications 101 running on top.

The structure 100 is a message passing software architecture that allows information to be passed between a client (a first process) and a server (a second process). The transport layer 108 provides the connection between the client and the server so information may be passed.

Appendix A contains a complete description of the Exigen Object Library (EOL); and Appendix B describes the Exigen Object Definition Language (EODL), a novel definition language that defines elements of the EOL. An advantage of the EOL is that objects created by the EOL are always stateful. This is greatly beneficial because there is no known way to consistently implement a security mechanism with stateless objects. These shall be deemed examples of an implementation for illustration, and not as the only way to implement the invention.

Figure 2:
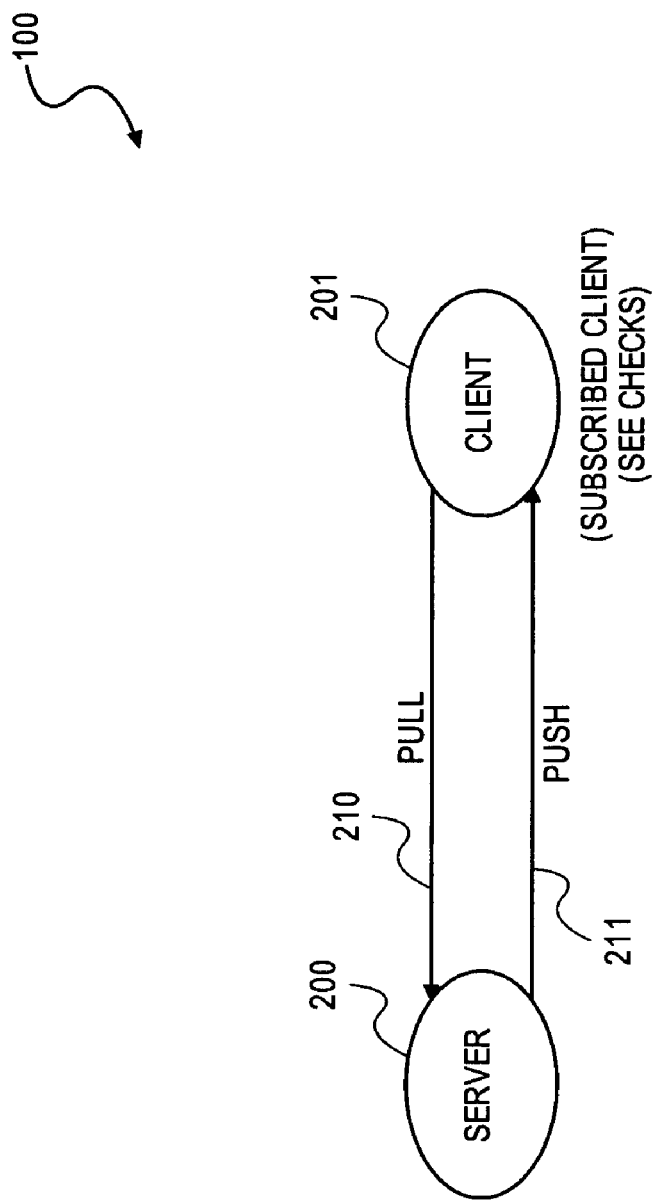
FIG. 2 is an illustration of a push and pull of information between a client and a server, according to one embodiment.

As is typical in a computing environment, FIG. 2 shows a client-server scenario, where a client 201 can either push 211 or pull 210 information from a server 200. A process using the EOL 107 may create an object and become a server 200 for that object. The server 200 creates references to that object, passes those references to other processes and the processes then become clients 201 for that server object. The advantage of the EOL architecture is that it allows for dynamic type matching between the server 200 and the client 201, allowing for a compatibility match. Certain rules, described in appendices A and B, govern this dynamic type matching.

As an example, most object interface changes add new methods or fields. The object types that differ structurally may still be compatible, allowing the client 201 to safely continue to interact with the newer server 200. However, an object may change behavior in ways that break compatibility between the client 201 and the server 200. To ensure compatibility, type structures are compared. When client 201 and server 200 have object types with the same name and same behavior version numbers, they are considered to be of the same type and compatibility is acknowledged. Due to dynamic matching, no mandatory upgrade of the client side 201 is required or necessary, so therefore it is easier for one software instance to operate on different data sets, and vice versa. Also, scripts can be handed over dynamically, which allows execution of a script on a client 201 pushed 211 by a server 200. If the object types are matched from the server 200 to the client 201 and found compatible, then information may be pushed 211 or pulled 210 between them.

Another very important and distinctive aspect of the novel art of this disclosure is that instead of using a fixed connection, a flow control is relied upon from the transport layer 108. When information is pushed 211 or pulled 210 from the client 201 to the server 200, the flow control provides a buffer at the origin of the flow so that there is no overflow of information to the recipient of the flow. For example, if a client 201 is sending information to a server 200, the flow control makes sure that the information does not overflow the server 200. The flow control chokes the stream going into the server 200, and the information provided by the client 201 is backed up on the client side 201, rather than the server side 200. This novel functionality allows data centers to be spread out over multiple locations, providing services to multiple users, while not overloading a server 200 with information from one specific client 201. Hence, such novel functionality adds an additional safety valve against clogging of multisite processing.

Figure 3:
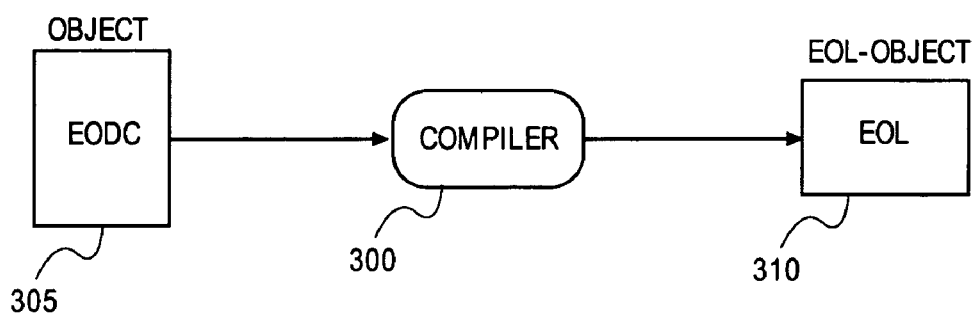
FIG. 3 is an illustration of a compiler that compiles a new object into a finished EOL object, according to one embodiment.

FIG. 3 shows a one-pass compiler 300 that can take a new object 305 and compile it in a single pass into a finished EOL object 310. The finished object 310 can then be embedded in the EOL layer 107 of FIG. 1.

As described in detail in Appendix B, sections 3–10.5, the EODL has descriptions for the following items: basic types, scripts, data streams (meaning open channels), dynamic state structure, security, cookies, and object reference.

Figure 4:
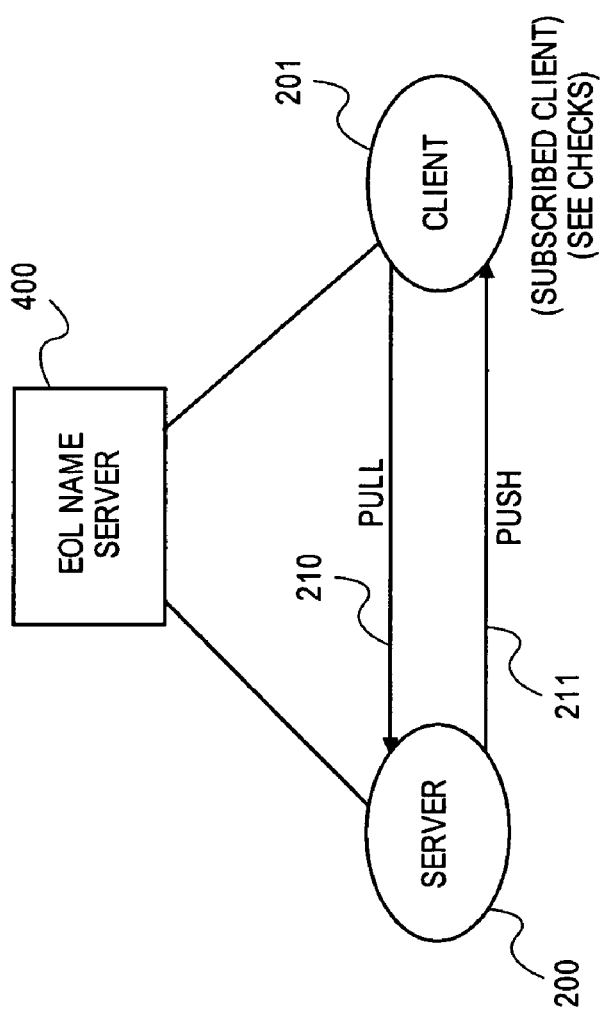
FIG. 4 is an illustration of a security model that allows for a secure connection between a client (first process) and a server (second process), according to one embodiment.

FIG. 4 describes the security model of the present invention. Security from clogging of information again relies upon the flow control previously described. Both the client 201 and the server 200 may check their respective security rights with an EOL name server 400. In another embodiment, the client 201 and server 200 may check their respective security rights with separate name servers. When a client 201 wants to access a server-side object, the client 201 needs a reference to that object. The service authentication process (one of the services 106a–n in FIG. 1) produces an initial "root" name server object. The name server system 400 locks up the requested object and gives the client 201 a cookie in return for verification. When the client 201 gets permission from the name server 400, the server 200 from which the client 201 wants to request services can verify permission directly from that name server 400. Once the security rights have been checked for the client 201 and the server 200, the client 201 and server 200 may communicate with each other by either pushing 211 or pulling 210 information.

The lifecycle of the server object is decided by the server 200 itself—the client 201 does not manage the lifecycle.

If access permission is authorized, the object references may be stored or passed between different client 201 processes. The security model also includes a version compatibility check, so that a client 201 can only reach those versions for which it has been cleared.

Appendix C further describes the cooperation between server 200 and client 201 objects; and Appendix D describes the nameserver system, which is rather novel.

Figure 5:
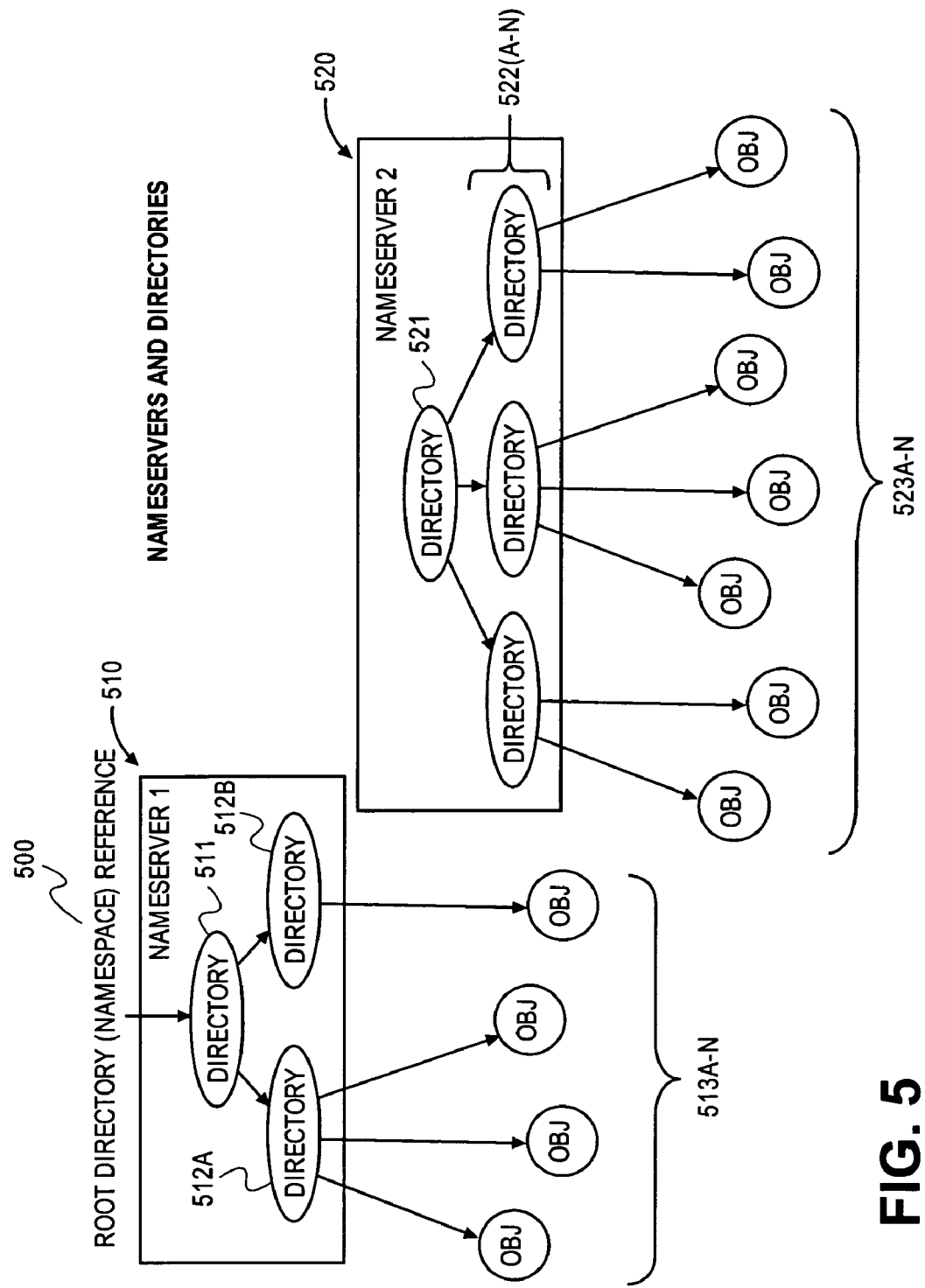
FIG. 5 is an illustration of an implementation of compatibility between a server and a client, according to one embodiment.

FIG. 5 shows an implementation of enhanced compatibility using a tree of nameservers and directories. Nameserver-1 510 holds the root (namespace) 500 of the system, which may have multiple layers of directories. In this example, directory 511, within nameserver-1 510, has its own root.

Subdirectories 512a and 512b manage objects 513a–n. One of the directories 512b in nameserver-1 510 then forms the root for nameserver-2 520. Nameserver-2 520 has its own internal root 521, and an additional layer of subdirectories 522a–n that manage objects 523a–n. Therefore, in essence, additional nameservers, directories, functional compatibility management servers, etc., are just additional clients to the root directory server. Each object 513a–n, 523a–n has a given name. The directory and nameserver managing that object then know the rights and locking capabilities of that object.

An application (i.e., activation manager application) is first run which uses the EOL to access a service such as computer authentication. A reference is then returned to the server's operational namespace 500 that contains the activation manager's configuration for the server and the references for the namespaces of individual server processes. The server process obtains its configuration from its namespace 500, as delegated by the activation manager, and performs initialization. Then using references to the user root nameserver from the configuration objects, the server process registers its service objects with these root nameservers, thus exposing the resources to users.

A further inventive aspect of this disclosure is that EOL programming provides a consistent way for asynchronous single-thread server implementations. The method invocation of an object, using EOL, is asynchronous (nonblocking)—while the server waits for the results, it can go on with other events in order to be as efficient as possible.

The above embodiments can also be stored on a device or machine-readable and be read by a machine to perform instructions. The machine-readable medium includes any mechanism that provides (i.e., stores and/or transmits) information in a form readable by a machine (e.g., a computer). For example, a machine-readable medium includes read only memory (ROM); random access memory (RAM); magnetic disk storage media; optical storage media; flash memory devices; etc.). The device or machine-readable medium may include a solid state memory device and/or a rotating magnetic or optical disk. The device or machine-readable medium may be distributed when partitions of instructions have been separated into different machines, such as across an interconnection of computers.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A computer implemented method executing on a computer, comprising:
   providing a secure connection between a client process and
   a server process, the client process having a first object type structure, the server process having
   a second object type structure, the client process provides a push of information to or
   a pull of information from the server process, wherein at least one of the client process and the server process creates a stateful object using an object library for asynchronous communication between the client process and the server process;
   dynamically determining whether the first object type structure matches the second object type structure through comparing names and behavior version numbers of the first object type structure and the second type object structure using an object library, the object library being between a transport layer of network communication and input and output channels, wherein a first name server contains
   a first plurality of directories to manage
   a first plurality of objects, one of the plurality of directories is a root of a second name server to provide compatibility between the first name server and the second name server, the second name server contains a second plurality of directories to manage
   a second plurality of objects; and
   utilizing a flow control provided by a transport layer for the secure connection,
   the flow control backs up information at the flow origin by providing a buffer at the flow origin to prevent overflow of information to a flow recipient, wherein the transport layer supports a plurality of point-to-point connections between the client process and the server process.

2. A system of software and hardware componets comprising;
   A means for providing a secure connection between a client process and a server process, the client process having a first object type structure, the server process having a second object type structure, the client process provides a push of information to or a pull of information from the server process, wherein at least one of the client process and the server process creates a stateful object using an object library for asynchronous communication between the client process and the server process;
   A means for dynamically determining whether the first object type structure matches the second object type structure through comparing names and behavior version numbers of the first object type structure and the second type object structure using an object library, the object library being between a transport layer of network communication and input and output channels, wherein a first name server contains a first plurality of directories to manage a first plurality of objects, one of the first plurality of directories is a root of a second name server to provide compatibility between the first name server and the second name server, the second name server contains a second plurality of directories to manage a second plurality of objects; and
   A means for utilizing a flow control provided by a transport layer for the secure connection, the flow control backs up information at the flow origin by providing a buffer at the flow origin to prevent overflow of information to a flow recipient, wherein the transport layer supports a plurality of point-to-point connections between the client process and the server process.

3. A machine readable medium having stored thereon a set of instructions which when executed, perform a meted comprising:
   providing a secure connection between a client process and a server process, the client process having a first object type structure, the server process having a second object type structure, the client process provides a push of information to or a pull of information from the server process) wherein at least one of the client process and the server process creates a stateful object using an object library for asynchronous communication between the client process and the server process; dynamically determining whether the first object type structure matches the second object type structure through comparing names and behavior version numbers of the first object type structure and the second type object structure using an object library, the object library being between a transport layer of network communication and input and output channels, wherein
   a first name server contains a first plurality of directories to manage a first plurality of objects, one of the first plurality of directories is a root of a second name server to provide compatibility between the first name server and the second name server, the second name server contains a second plurality of directories to manage a second plurality of objects; and utilizing a flow control provided by a transport layer for the secure connection, the flow control backs up information at the flow origin by providing a buffer at the flow origin to prevent overflow of information to a flow recipient, wherein the transport layer supports a plurality of point-to-point connections between the client process and the server process.

* * * * *